United States Patent
Levin et al.

(10) Patent No.: US 12,217,078 B2
(45) Date of Patent: *Feb. 4, 2025

(54) EFFICIENT VIRTUAL MACHINE SCANNING

(71) Applicant: Palo Alto Networks, Inc., Santa Clara, CA (US)

(72) Inventors: Liron Levin, Kefar Sava (IL); Eran Yanay, Modiin (IL); Gilad Astrin, Herzliya (IL); Dima Stopel, Herzliya (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,239

(22) Filed: Aug. 7, 2023

(65) Prior Publication Data

US 2023/0376341 A1    Nov. 23, 2023

Related U.S. Application Data (63) Continuation of application No. 16/930,778, filed on Jul. 16, 2020, now Pat. No. 11,762,678.

(51) Int. Cl.
     *G06F 9/455*      (2018.01)
     *G06F 9/54*      (2006.01)

(52) U.S. Cl.
     CPC ............ *G06F 9/45558* (2013.01); *G06F 9/54* (2013.01); *G06F 2009/4557* (2013.01); *G06F 2009/45587* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,409,719 B2 | 8/2008 | Armstrong et al. | |
| 7,797,748 B2 | 9/2010 | Zheng et al. | |
| 8,011,010 B2 | 8/2011 | Michael et al. | |
| 8,676,949 B2 * | 3/2014 | Vilke ................. | G06F 9/45533 709/224 |
| 9,141,410 B2 | 9/2015 | Leafe et al. | |
| 9,355,257 B2 | 5/2016 | Chari et al. | |
| 9,756,070 B1 | 9/2017 | Crowell et al. | |

(Continued)

OTHER PUBLICATIONS

Cao et al. "Security Scanner System of oVirt Cloud Platform", 2016 IEEE, pp. 357-360.*

(Continued)

*Primary Examiner* — Van H Nguyen
(74) *Attorney, Agent, or Firm* — Gilliam IP PLLC (57) ABSTRACT

A system and method for scanning of virtual machine images. The method includes creating a virtual machine instance of a virtual machine based on a virtual machine image of the virtual machine and an application programming interface (API) of an environment in which the virtual machine is to be deployed, wherein the virtual machine image has an entry point such that the virtual machine instance executes the entry point; and replacing the entry point of the virtual machine instance with a lightweight script, wherein the lightweight script is configured to retrieve a static scanner executable, to execute the static scanner executable, and to send results of the scanning.

20 Claims, 4 Drawing Sheets

(56) References Cited

U.S. PATENT DOCUMENTS

| | | |
|---|---|---|
| 10,026,070 B2 | 7/2018 | Thorpe et al. |
| 10,642,751 B2 | 5/2020 | Warkentin |
| 10,943,014 B2 | 3/2021 | Stopel et al. |
| 10,970,129 B2 | 4/2021 | Tian et al. |
| 11,762,678 B2 * | 9/2023 | Levin .................. G06F 9/45558 718/1 |
| 2012/0233668 A1 | 9/2012 | Leafe et al. |
| 2017/0116412 A1 | 4/2017 | Stopel et al. |
| 2019/0026232 A1 | 1/2019 | Warkentin et al. |
| 2019/0286479 A1 | 9/2019 | Tian et al. |
| 2020/0304526 A1 | 9/2020 | Abraham et al. |

OTHER PUBLICATIONS

Chen et al. "Integrating Deadline-Modification SCAN Algorithm to Xen-based Cloud Platform", 2013 IEEE, 4 pages.*
Deshpande et al. "Distributed Port-Scan Attack in Cloud Environment", 2013 IEEE, pp. 27-31.*

* cited by examiner

EFFICIENT VIRTUAL MACHINE SCANNING

TECHNICAL FIELD

The present disclosure relates generally to scanning of virtual machines, and more particularly to techniques for efficiently scanning virtual machines.

BACKGROUND

With the advent of cloud computing, the use of virtual machines has become common practice for many industries. A virtual machine is an emulation of a computer system. Virtual machines allow for greater modularity in computer operation, and can therefore be applied in a wide variety of uses.

In order to utilize virtual machines consistent with applicable compliance policies, customers are required to scan their virtual machine images for compliance and vulnerabilities prior to deployment. This requires additional computing resources on top of the computing resources needed to operate the virtual machines. In particular, existing solutions require the agent performing the scanning to be at the same computer location as the image to be scanned. As a result, these solutions either require downloading the images to be scanned or deployment of an agent at the location where the images are stored. This may slow down the scanning and requires use of dedicated network and storage resources, which in turn may interfere with or impede other processes at that location. Further, when scanning involves analyzing a dynamic instance of an image at runtime, executing the image introduces security risks in the environment in which the image is stored.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for scanning of virtual machine images. The method comprises: creating a virtual machine instance of a virtual machine based on a virtual machine image of the virtual machine and an application programming interface (API) of an environment in which the virtual machine is to be deployed, wherein the virtual machine image has an entry point such that the virtual machine instance executes the entry point; and replacing the entry point of the virtual machine instance with a lightweight script, wherein the lightweight script is configured to retrieve a static scanner executable, to execute the static scanner executable, and to send results of the scanning.

Certain embodiments disclosed herein also include a non-transitory computer readable medium having stored thereon causing a processing circuitry to execute a process, the process comprising: creating a virtual machine instance of a virtual machine based on a virtual machine image of the virtual machine and an application programming interface (API) of an environment in which the virtual machine is to be deployed, wherein the virtual machine image has an entry point such that the virtual machine instance executes the entry point; and replacing the entry point of the virtual machine instance with a lightweight script, wherein the lightweight script is configured to retrieve a static scanner executable, to execute the static scanner executable, and to send results of the scanning.

Certain embodiments disclosed herein also include a system for scanning of virtual machine images. The system comprises: a processing circuitry; and a memory, the memory containing instructions that, when executed by the processing circuitry, configure the system to: create a virtual machine instance of a virtual machine based on a virtual machine image of the virtual machine and an application programming interface (API) of an environment in which the virtual machine is to be deployed, wherein the virtual machine image has an entry point such that the virtual machine instance executes the entry point; and replace the entry point of the virtual machine instance with a lightweight script, wherein the lightweight script is configured to retrieve a static scanner executable, to execute the static scanner executable, and to send results of the scanning.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

To address the issues with added computing resources for scanning virtual machines prior to deployment, the disclosed embodiments provide techniques for cost-efficient virtual machine scanning. More specifically, various disclosed embodiments provide techniques for performing compliance and vulnerability scanning which may be utilized for large virtual machine images such as those hosted in cloud computing infrastructures.

The disclosed embodiments further do not require downloading virtual machine images in order to complete scanning. The disclosed embodiments provide advantages such as, but not limited to, reducing download times associated with retrieving virtual machines, improving security of environments in which the virtual machines are to be deployed, allowing for approaches which do not require use of agents or additional deployments in the environment where the virtual machine image is to be deployed, and the like.

The various disclosed embodiments include a method and system for virtual machine scanning. A lightweight virtual machine instance is created in a secure environment based on a virtual machine image and an application programming interface of the environment in which the virtual machine image is to be deployed. In an embodiment, a cost-efficient type of virtual machine may be selected for the lightweight virtual machine to be created.

The cost-efficient type of virtual machine is a type of virtual machine which utilizes excess computing resources rather than dedicated computing resources. As a result, the cost-efficient type of virtual machine provides more efficient use of existing computing resources and allows for the possibility of utilizing types of virtual machines which computing resource providers typically charge less to use. The cost-efficient type of virtual machine may be, for example, a preemptive (also known as pre-emptible) instance or a spot instance.

An image entry point of the virtual machine image is replaced with a lightweight script. The lightweight script is configured to cause scanning of the image and to send results of the scan for further use. The script is lightweight in that it does not include all of the code required for scanning and instead uses at least some external code in order to cause the scanning. To this end, the lightweight script may be configured to retrieve and execute a static scanner executable that includes instructions for scanning virtual machine images.

In an embodiment, the lightweight virtual machine instance is configured such that no incoming internal traffic is allowed, only specific applications are allowed to be executed by the virtual machine instance, the lightweight virtual machine instance cannot communicate via unsecured networks, or a combination thereof.

Benefits of some specific aspects of the disclosure may include: creating an instance of a virtual machine image based on an application programming interface instead of downloading the virtual machine image can significantly improve scanning time; and using preemptive virtual machines may reduce computing resource costs significantly.

Figure 1:
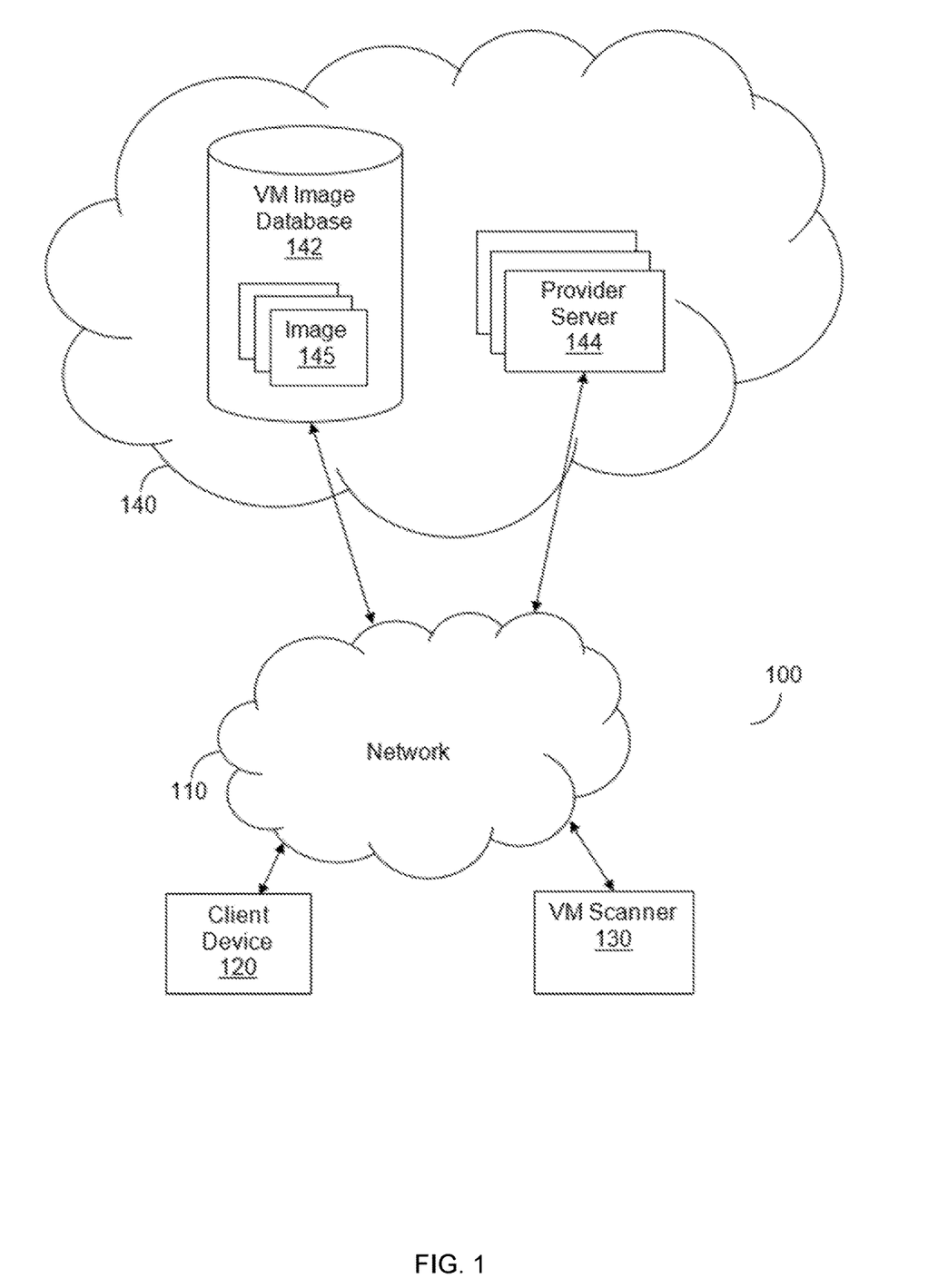
FIG. 1 is a network diagram utilized to describe various disclosed embodiments.

FIG. 1 shows an example network diagram 100 utilized to describe the various disclosed embodiments. In the example network diagram 100, a client device 120, a virtual machine (VM) scanner 130, and a computing resource provider environment 140 are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The client device 120 may be, but is not limited to, a personal computer, a laptop, a tablet computer, a smartphone, a wearable computing device, or any other device capable of receiving user inputs and sending requests via the network 110. The client device 120 may be operated by a user seeking to use one or more virtual machine images among images 145 stored in a virtual machine image database 142 of the computing resource provider environment 140. To this end, in an example implementation, the client device 120 sends a request to the virtual machine scanner 130 to scan one or more of the virtual machine images 145.

The computing resource provider environment 140 is an environment utilized by an entity which remotely provides computing resources and includes the virtual machine image database 142 and one or more provider servers 144. In an example implementation, the computing resource provider environment 140 is a cloud computing environment allowing for running applications at least partially hosted on cloud servers acting as the provider servers 144. Each provider server 144 is configured to provide computing resources for remote processes and is configured to execute instances of the images 145.

In an example implementation, the virtual machine image database 142 is configured to store virtual machine images 145. Each image 145 is static data including the software that is executed when a respective virtual machine is executed, for example, via a computing resource provider server 144. The result of executing one of the images 145 is an instance (not shown) of the image 145. Thus, an instance is a dynamic runtime version of a virtual machine image 145 capable of running software such as operating systems, processes, and the like.

The virtual machine scanner 130 is configured to efficiently scan the requested virtual machine images 145 as described herein. In the example implementation shown in FIG. 1, the virtual machine scanner 130 is deployed outside of the computing resource provider environment 140.

The virtual machine scanner 130 is configured to instantiate instances of the virtual machine images 145 in the computing resource environment 140. More specifically, the instances are instantiated via the provider server 144. The virtual machine scanner 130 may be further configured with one or more application programming interfaces used by the virtual machine image database 142 (e.g., application programming interfaces of cloud management platforms hosting the virtual machine image databases, not shown), or may be configured to access such application programming interfaces from such cloud management or other platforms, in order to create lightweight instances of the virtual machine images using such application programming interfaces.

It should be noted that a single virtual machine image database 142 and a single provider server 144 of a single computing resource provider environment 140 are shown in FIG. 1 merely for simplicity purposes, but that the disclosed embodiments may be equally applicable to multiple computing resource provider environments. Further, each computing resource provider environment may include multiple virtual machine image databases, multiple servers, or both, without departing from the scope of the disclosure. Moreover, the virtual machine scanner 130 is depicted as a hardware system, but the virtual machine scanner 130 may be implemented as a virtual component (e.g., a software container or virtual machine) without departing from the scope of the disclosure.

Figure 2:
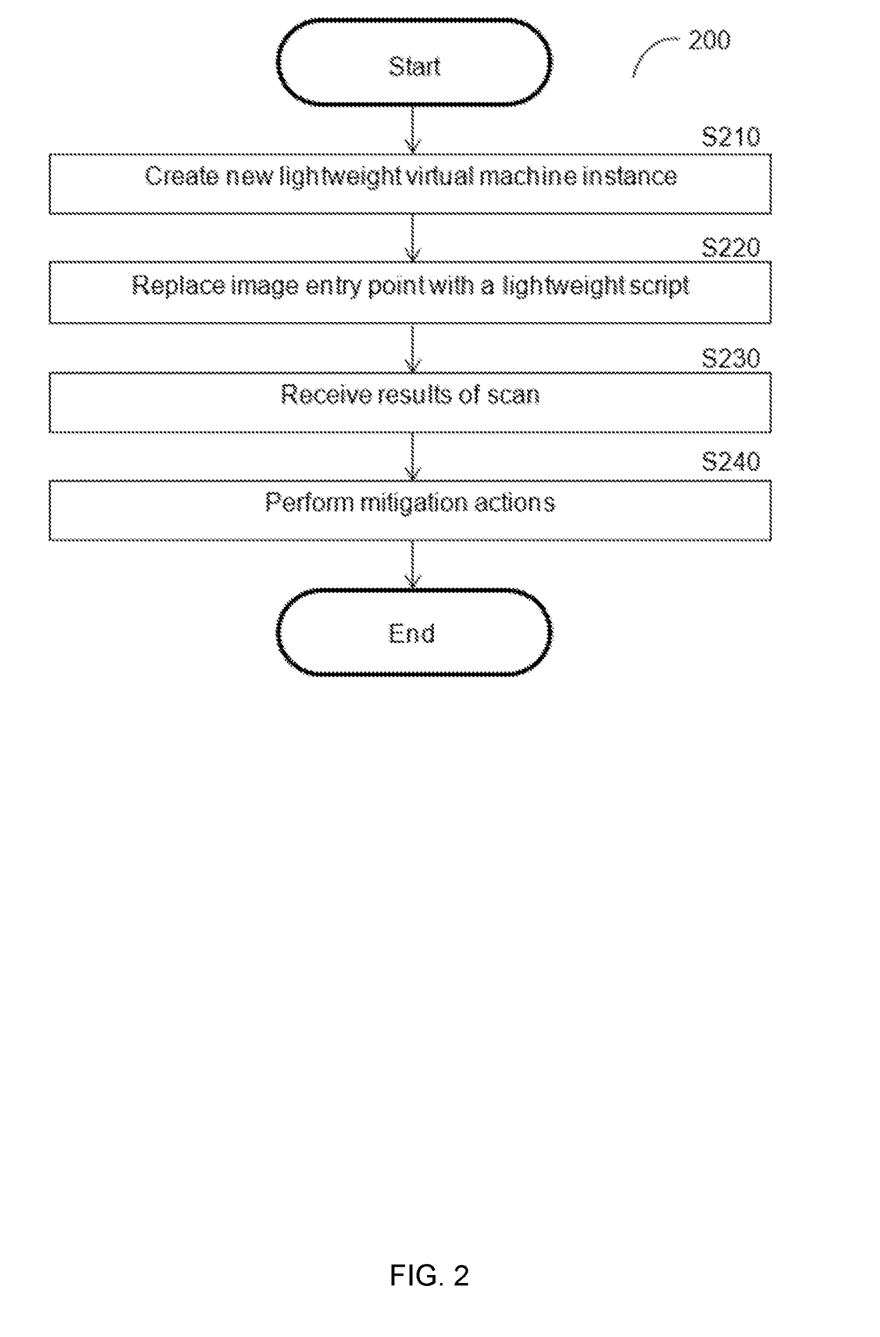
FIG. 2 is a flowchart illustrating a method for cost-efficient virtual machine scanning according to an embodiment.

FIG. 2 is an example flowchart 200 illustrating a method for cost-efficient virtual machine scanning according to an embodiment.

At S210, a new lightweight virtual machine instance is created based on a virtual machine image to be scanned. The lightweight virtual machine instance is created in a cost-efficient and secure manner. The lightweight virtual machine instance may be created using computing resources which have access to the location in which the virtual machine image is stored (e.g., one of the provider servers 144 which can access the images 145, FIG. 1). Creating a lightweight virtual machine instance is now described further with respect to FIG. 3.

Figure 3:
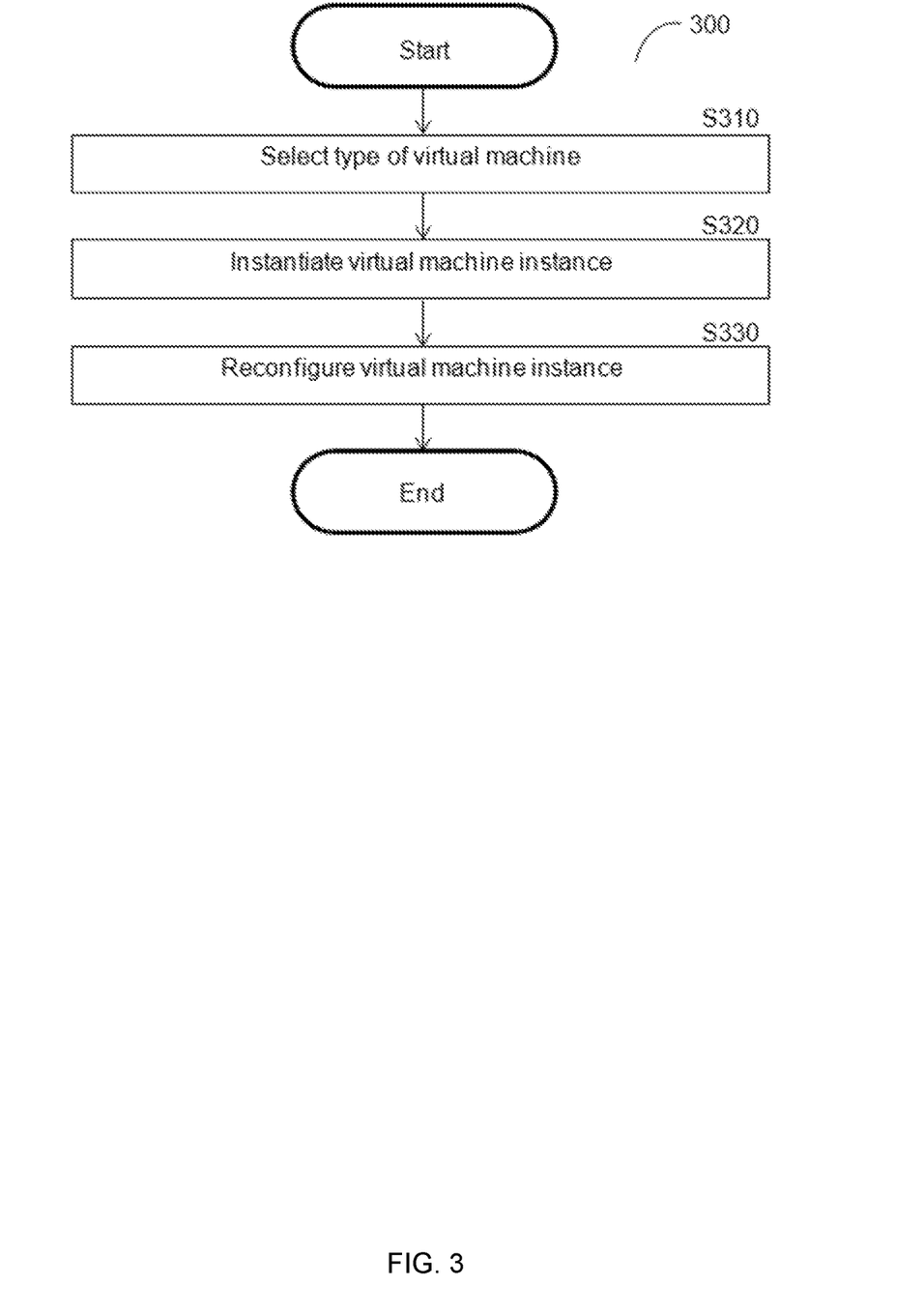
FIG. 3 is a flowchart illustrating a method for creating a lightweight virtual machine instance according to an embodiment.

FIG. 3 is an example flowchart illustrating a method for creating a lightweight virtual machine instance according to an embodiment.

At S310, a type of virtual machine is selected for the lightweight virtual machine instance to be created. In an embodiment, the selected type of virtual machine is a cost-efficient type of virtual machine and may be, but is not limited to, a preemptive virtual machine, a spot instance virtual machine, or another type of virtual machine which utilizes excess computing resources of a computing resource provider (e.g., a cloud provider) and therefore has reduced cost as compared to dedicated computing resources.

At S320, the virtual machine instance is instantiated using the selected type of virtual machine, the virtual machine image, and one or more application programming interfaces (APIs) of the environment in which the original virtual machine image is stored. In an embodiment, the virtual machine instance is instantiated in the same environment in which the virtual machine image is stored (e.g., in a server deployed in a cloud computing environment that also includes a storage in which the virtual machine image is stored).

By using the virtual machine image and such APIs, the image can be accurately scanned without requiring downloading the virtual machine image. This, in turn, reduces the download time needed for obtaining the data to be scanned and, therefore, improves efficiency of the scanning. Additionally, since the image is not downloaded, the disclosed embodiments do not depend on the format of the image. Thus, the instance of the virtual machine image may be created agnostic of formats such as open virtualization format (OVF), Virtual Machine Disk (OMDK), and the like.

In a further embodiment, the lightweight virtual machine instance is created based on a known budget for the scanning and an expected scanning time. The expected time may be determined based on historical scan times for images of various types of virtual machines. More specifically, the expected scanning time is based on a type of virtual machine to be scanned and a size of the virtual machine's image. As a non-limiting example for creating a virtual machine instance based on a known budget and an expected scanning time, historical scan times from scans involving multiple types of virtual machines (as a non-limiting example, virtual machines having specifications such as a1.large, c4.large, t2.micro, etc., of Amazon Web Services®).

In this regard, it is noted that cloud providers such as Google, Inc., Amazon, Inc., and Microsoft, Inc. may offer cost-efficient virtual machines which utilize excess computing resources. These excess resource virtual machines may be less expensive than dedicated virtual machine hosting but subject to eviction when the computing resources are no longer excess (i.e., when the resources are needed by another process).

It has been identified that the scanning process described herein may effectively use these excess resource virtual machine types since the scanning only requires the resources for a limited period of time (i.e., the scanning will typically be completed before eviction occurs) and, even if eviction occurs, minimal computing resources will have been wasted. Accordingly, the disclosed scanning may take advantage of the cost-efficient nature of these excess resource virtual machines without being significantly impacted by the typical eviction downsides. The result of using such excess resource virtual machine types may be a cost reduction of as much as 90% as compared to using dedicated virtual machine types.

At S330, the instantiated virtual machine instance is reconfigured. The reconfiguration may include any combination of the following settings: no incoming internal traffic is allowed, only specific applications are allowed to run on the lightweight virtual machine instance (e.g., a predetermined whitelisted set of applications); no communications are permitted via unsecured networks; no code that could perform changes in the environment of the lightweight virtual machine instance is permitted to run (e.g., code which would connect to a database of the environment in which the instance is deployed); access is limited to specific systems or storages (e.g., only a designated storage or management console is allowed to be accessed), or a combination thereof. These configurations improve security of the scanning process by restricting communications and software which may be harmful if the image is malicious or otherwise not in compliance with applicable security rules.

Returning to FIG. 2, at S220, an image entry point of the virtual machine image is replaced with a lightweight script. The image entry point is where the first instructions of the virtual machine image are executed. The lightweight script may be, but is not limited to, a binary file that contains compiled machine code. The type of binary depends on the operating system which will be used to execute the lightweight script and may be written using a programming language such as, but not limited to, C, C++, JavaScript, Python, and the like.

In an embodiment, the lightweight script is configured to cause scanning of the virtual machine image and to send the results of the scan for further use (e.g., a system deployed in a cloud management platform) such as, but not limited to, the virtual machine scanner 130, FIG. 1. To this end, in an embodiment, the lightweight script may be configured to pull (i.e., retrieve) and execute a static scanner executable. The static scanner executable is an executable file including instructions that, when executed by a processing circuitry, configure the processing circuitry to scan a virtual machine image. The static scanner executable may be pulled, for example, from a software-as-a-service provider system or an on-premises console. Alternatively, the static scanner executable may be uploaded to a region in which the virtual machine scanner operates (e.g., a cloud region) such that it is locally accessible to the virtual machine scanner.

In an embodiment where one or more rules of the computing resource provider environment in which the virtual machine image is to be deployed do not allow for initialization scripts, the lightweight script is stored using a storage mechanism instead of being incorporated into the virtual machine instance. Such storage mechanism may be, but is not limited to, a cloud provider storage resource such as an Amazon® S3 bucket. In such an embodiment, the lightweight script is stored in a location that can be called by the virtual machine instance such that the lightweight script is pulled during execution of a startup script of the virtual machine image. Accordingly, in such an embodiment, rather than replacing the entire entry point with the lightweight script, an instruction to pull and run the lightweight script from the appropriate location may be added to the entry point, thereby replacing the normal entry point with a modified entry point which pulls and runs the scanner executable.

In another embodiment where one or more communication rules of the computing resource provider environment in which the virtual machine image is to be deployed (e.g., cloud provider firewall rules) do not allow for external traffic of nodes therein, the lightweight script is configured to store results of the scan using a storage mechanism of the computing resource provider environment. Such a storage mechanism may be, but is not limited to, a cloud provider storage resource such as an Amazon® S3 bucket. The scan results can be accessed via the cloud provider storage resource by an appropriate entity (e.g., a system managing security in the cloud provider's platform).

At S230, results of the scan are received from the created instance of the virtual machine image. The results of the scan indicate whether the underlying virtual machine image is in compliance with one or more security rules or polices of the entity hosting the virtual machine image and/or whether the underlying virtual machine image exhibits characteristics of any known vulnerabilities.

In some implementations, the scanner executable is configured to check security rules or policies stored in one or more external databases, and to determine whether the scanned image is in compliance with each applicable rule or policy. Such rules or policies may include, but are not limited to, allowing access only to certain systems or groups of systems, creating multiple instances for a single instantiation of a virtual machine, interacting directly with a hypervisor, creating a large (e.g., above a threshold) amount of traffic over a network, interacting with other virtual machines, migrating the virtual machine to a new host, and the like. An image may violate such policies when the image is configured to perform one or more forbidden actions.

As noted above, in some embodiments, the results of the scan may be stored in a storage mechanism of the computing resource provider environment in which the virtual machine image is to be deployed. Accordingly, in such embodiments, the results of the scan may be retrieved from such a storage mechanism instead of being received from the server executing the virtual machine instance.

At optional S240, when results of the scan indicate that the underlying virtual machine image is not in compliance or exhibits a known vulnerability, one or more mitigation actions may be performed. The mitigation actions may include, but are not limited to, removing the virtual machine image from a repository (e.g., the virtual machine image database 142, FIG. 1), sending a notification to a system associated with the environment in which the virtual machine image is hosted (e.g., a cloud provider manager server), both, and the like.

Figure 4:
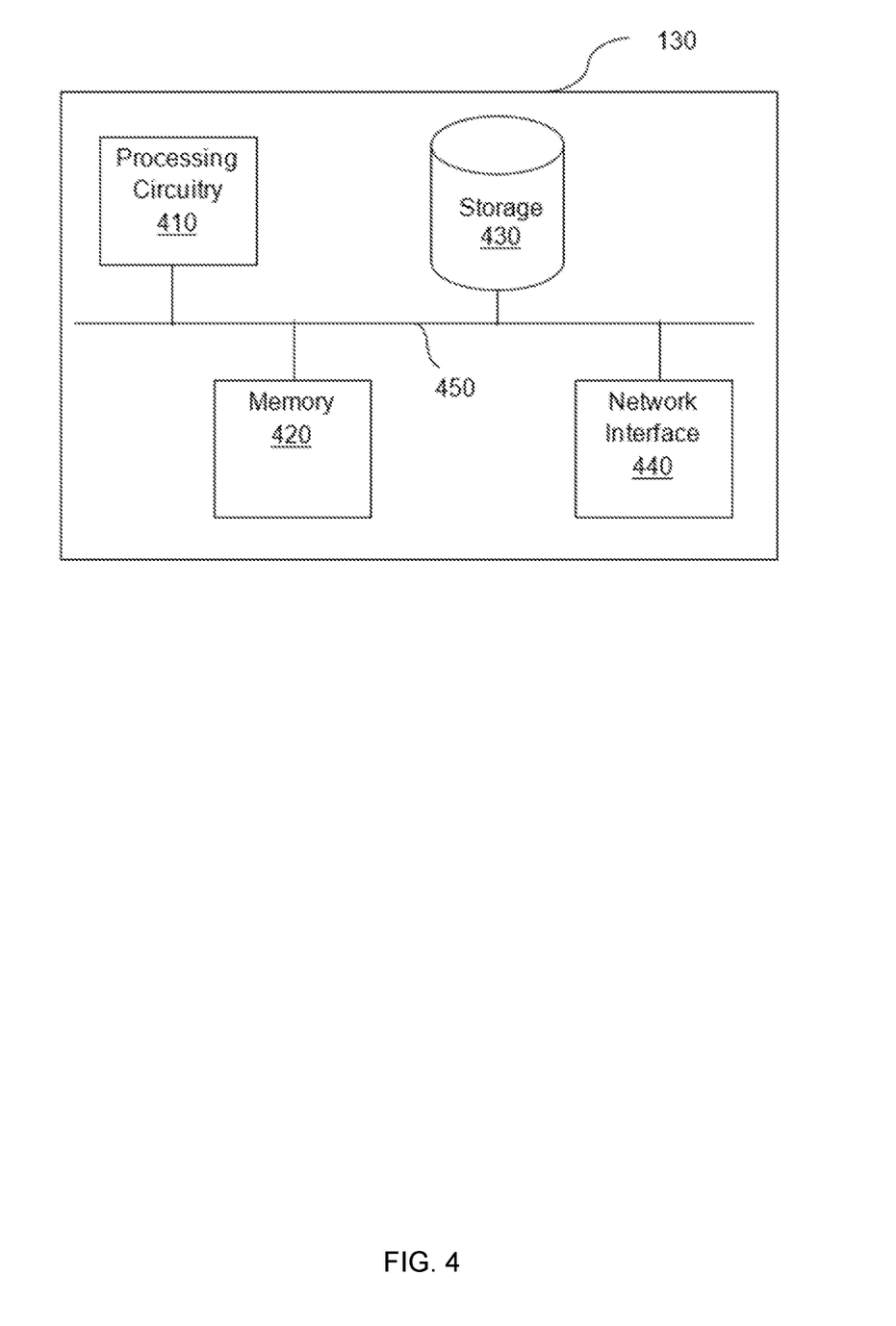
FIG. 4 is a schematic diagram of a virtual machine scanner according to an embodiment.

FIG. 4 is an example schematic diagram of a virtual machine scanner 130 according to an embodiment. The virtual machine scanner 130 includes a processing circuitry 410 coupled to a memory 420, a storage 430, and a network interface 440. In an embodiment, the components of the virtual machine scanner 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the virtual machine scanner 130 to communicate with the client device 120 for purposes such as for example, receiving requests to scan virtual machine images. The network interface 440 further allows the virtual machine scanner 130 to communicate with the computing resource provider environment 140 in order to scan virtual machine images in accordance with the disclosed embodiments.

It should be understood that the embodiments described herein are not limited to the specific architecture illustrated in FIG. 4, and other architectures may be equally used without departing from the scope of the disclosed embodiments. In particular, the virtual machine scanner 130 is depicted as a hardware device, but can be realized as a software device (e.g., a software container or a virtual machine) executed over a host including at least some of the hardware components described with respect to FIG. 4.

It should be noted that various disclosed embodiments describe a lightweight script as performing various activities for simplicity purposes, but that the lightweight script performs these activities when executed by a virtual machine instance by configuring the virtual machine instance to perform these activities. The lightweight script is executed by a hardware device including a processing circuitry.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method comprising:
    modifying an entry point of a virtual machine image to indicate a script which, when executed, causes retrieval and running of a scanner executable to scan the virtual machine image, wherein modifying the entry point of the virtual machine image to indicate the script comprises one of,
        replacing the entry point with the script; and
        inserting one or more instructions into the entry point to retrieve the script from a storage location and to run the retrieved script; and
    creating a virtual machine instance based on the modified virtual machine image with an application programming interface (API) of a cloud computing environment in which the virtual machine image is stored.

2. The method of claim 1, wherein the storage location is within the cloud computing environment.

3. The method of claim 1 further comprising the virtual machine instance retrieving the scanner executable from a software-as-a-service provider system or an on-premises console when the script is run.

4. The method of claim 1, wherein the script is configured to use a storage mechanism of the cloud computing environment to store results of scanning the virtual machine image when firewall rules of the cloud computing environment do not allow for external traffic of nodes therein.

5. The method of claim 1, wherein modifying the entry point comprises inserting the one or more instructions into the entry point if one or more rules of the cloud computing environment do not allow for initialization scripts.

6. The method of claim 1, wherein creating the virtual machine instance with the API comprises creating the virtual machine instance that utilizes excess computing resources of the cloud computing resource environment.

7. The method of claim 1, wherein creating the virtual machine instance with the API comprises creating a preemptive virtual machine instance or a spot virtual machine instance with the API.

8. The method of claim 1, wherein startup of the virtual machine instance runs the scanner executable which causes scanning of the virtual machine image.

9. The method of claim 1, wherein creating the virtual machine instance is based on a historical scanning based budget for scanning and an expected scanning time that is based on at least one of size and type of the virtual machine image.

10. The method of claim 1, further comprising configuring the virtual machine instance with at least one configuration, wherein the at least one configuration includes at least one of: no internal traffic allowed, only predetermined allowable applications are allowed to run, no code which could perform changes in the environment is allowed to run, access is limited, and no communications are allowed via unsecured networks.

11. The method of claim 1 further comprising performing one or more mitigation actions based on results of scanning the virtual machine image indicating that the underlying virtual machine image is not in compliance or exhibits a known vulnerability, wherein the one or more mitigation actions comprise at least one of removing the virtual machine image from a repository and sending a notification to a system associated with the cloud computing environment.

12. A non-transitory, computer-readable medium having program code stored thereon, the program code comprising instructions to:
    modify an entry point of a virtual machine image to indicate a script which, when executed, causes retrieval and running of a scanner executable to scan the virtual machine image, wherein the instructions to modify the entry point of the virtual machine image to indicate the script comprise at least one of, instructions to replace the entry point with the script; and
    instructions to insert one or more instructions into the entry point to retrieve the script from a storage location and to run the retrieved script; and
    create a virtual machine instance based on the modified virtual machine image with an application programming interface (API) of a cloud computing environment in which the virtual machine image is stored.

13. The computer-readable media of claim 12, wherein the script is configured to use a storage mechanism of the cloud computing environment to store results of scanning the virtual machine image when firewall rules of the cloud computing environment do not allow for external traffic of nodes therein.

14. The computer-readable media of claim 12, wherein the instructions to create the virtual machine instance comprise the instructions to create the virtual machine instance based on a historical scanning based budget for scanning and an expected scanning time that is based on at least one of size and type of the virtual machine image.

15. The computer-readable media of claim 12, wherein the instructions to create the virtual machine instance with the API comprise instructions to create a preemptive virtual machine instance or a spot virtual machine instance with the API.

16. The computer-readable media of claim 12, wherein the program code further comprises instructions to perform one or more mitigation actions based on results of scanning the virtual machine image indicating that the underlying virtual machine image is not in compliance or exhibits a known vulnerability, wherein the one or more mitigation actions comprise at least one of removing the virtual machine image from a repository and sending a notification to a system associated with the cloud computing environment.

17. An apparatus comprising:
a processor; and
a machine-readable medium having instructions stored thereon that are executable by the processor to cause the apparatus to,
modify an entry point of a virtual machine image to indicate a script which, when executed, causes retrieval and running of a scanner executable to scan the virtual machine image, wherein the instructions to modify the entry point of the virtual machine image to indicate the script comprise at least one of, instructions to replace the entry point with the script; and
instructions to insert one or more instructions into the entry point to retrieve the script from a storage location and to run the retrieved script; and
create a virtual machine instance based on the modified virtual machine image with an application programming interface (API) of a cloud computing environment in which the virtual machine image is stored.

18. The apparatus of claim 17, wherein the instructions to create the virtual machine instance comprise the instructions being executable by the processor to cause the apparatus to create the virtual machine instance based on a historical scanning based budget for scanning and an expected scanning time that is based on at least one of size and type of the virtual machine image.

19. The apparatus of claim 17, wherein the instructions to create the virtual machine instance with the API comprise the instructions being executable by the processor to cause the apparatus to create a preemptive virtual machine instance or a spot virtual machine instance with the API.

20. The apparatus of claim 17, wherein the machine-readable medium further has stored thereon instructions executable by the processor to cause the apparatus to perform one or more mitigation actions based on results of scanning the virtual machine image indicating that the underlying virtual machine image is not in compliance or exhibits a known vulnerability, wherein the one or more mitigation actions comprise at least one of removing the virtual machine image from a repository and sending a notification to a system associated with the cloud computing environment.

* * * * *